(12) United States Patent
Chidambaran et al.

(10) Patent No.: US 8,424,688 B2
(45) Date of Patent: Apr. 23, 2013

(54) PREPARATION OF HIGH PERFORMANCE ULTRA FILTRATION HOLLOW FIBER MEMBRANE

(75) Inventors: Ravi Chidambaran, Canonsburg, PA (US); Devesh Sharma, Washington, PA (US); Pavan Raina, Pune (IN); Sugata Das, Pune (IN)

(73) Assignee: Aquatech International Corporation, Canonsburg, PA (US)

( * ) Notice: Subject to any disclaimer, the term of this patent is extended or adjusted under 35 U.S.C. 154(b) by 0 days.

(21) Appl. No.: 13/354,664

(22) Filed: Jan. 20, 2012

(65) Prior Publication Data

US 2012/0111790 A1   May 10, 2012

Related U.S. Application Data

(62) Division of application No. 12/481,909, filed on Jun. 10, 2009, now Pat. No. 8,104,624.

(30) Foreign Application Priority Data

Jun. 10, 2008   (IN) ............................ 1369/DEL/2008

(51) Int. Cl.
  *B01D 33/00*   (2006.01)
  *B01D 39/00*   (2006.01)
  *B01D 39/14*   (2006.01)
(52) U.S. Cl.
  USPC ............. 210/500.23; 210/500.41; 210/500.42
(58) Field of Classification Search ............. 210/500.23, 210/500.41, 490, 500.27, 500.42; 264/48, 264/49, 205, 171.26
See application file for complete search history.

(56) References Cited

U.S. PATENT DOCUMENTS

| | | | |
|---|---|---|---|
| 4,051,300 A | | 9/1977 | Klien et al. |
| 5,151,227 A | * | 9/1992 | Nguyen et al. ................... 264/41 |
| 5,232,597 A | * | 8/1993 | Eguchi ..................... 210/500.23 |

(Continued)

FOREIGN PATENT DOCUMENTS

| | | | |
|---|---|---|---|
| EP | 0 750 938 A1 | | 1/1997 |
| EP | 1875956 | * | 7/2006 |

OTHER PUBLICATIONS

International Search Report (PCT/ISA/210) and Written Opinion of the International Searching Authority (PCT/ISA/237) for PCT/US2009/046851 dated Jul. 31, 2009.
Supplementary European Search Report dated Sep. 7, 2012 for EP 09 76 3502.

*Primary Examiner* — Ana Fortuna
(74) *Attorney, Agent, or Firm* — Buchanan Ingersoll & Rooney PC

(57) ABSTRACT

A multipolymeric mixture is provided that includes a hydrophobic polymer, two different grades of a water-soluble polymer, water as non-solvent and a solvent suitable for all polymers involved. The dissolved hydrophobic polymer has the affinity to enmesh the water-soluble polymers to form a clear and viscous dope. Water-soluble polymers contribute to the pore formation process and hydrophilicity of the finally coagulated membrane according to the makeup of their molecular weight distribution.

Water as a non-solvent takes the dope very near towards unstable zone, which helps in speeding up the membrane formation process in a diffusion induced phase inversion technique. The dope is then spun through a concentric orifice spinneret and solidified by passing it through a coagulation bath to form hollow fiber asymmetric membranes of ultra filtration grade with superior water permeability and separation characters even at higher feed turbidity.

3 Claims, 7 Drawing Sheets

U.S. PATENT DOCUMENTS

| | | | |
|---|---|---|---|
| 5,340,480 A * | 8/1994 | Kawata et al. | 210/500.23 |
| 5,683,916 A | 11/1997 | Goffe et al. | |
| 5,762,798 A | 6/1998 | Wenthold et al. | |
| 5,938,929 A | 8/1999 | Shimagaki et al. | |
| 6,165,363 A * | 12/2000 | Oishi et al. | 210/500.23 |
| 6,355,720 B1 * | 3/2002 | Canard et al. | 524/501 |
| 6,355,730 B1 | 3/2002 | Kozawa et al. | |
| 6,416,668 B1 | 7/2002 | Al-Samadi | |
| 6,596,167 B2 | 7/2003 | Ji et al. | |
| 7,070,721 B2 | 7/2006 | Ji et al. | |
| 7,638,052 B2 * | 12/2009 | Mabuchi et al. | 210/500.23 |
| 7,861,869 B2 * | 1/2011 | Beckers et al. | 210/490 |
| 8,104,624 B2 * | 1/2012 | Chidambaran et al. | 210/500.23 |
| 2005/0072731 A1 * | 4/2005 | Kozawa et al. | 210/500.21 |
| 2006/0205309 A1 * | 9/2006 | Mabuchi et al. | 442/338 |
| 2008/0197072 A1 * | 8/2008 | Ansorge et al. | 210/500.41 |
| 2009/0057225 A1 * | 3/2009 | Krause et al. | 210/650 |
| 2009/0283470 A1 | 11/2009 | Krause et al. | |
| 2010/0197859 A1 * | 8/2010 | Weber et al. | 525/54.3 |
| 2010/0219122 A1 * | 9/2010 | Ogawa et al. | 210/500.23 |
| 2010/0230843 A1 * | 9/2010 | Ansorge et al. | 264/41 |

* cited by examiner

Figure: 1
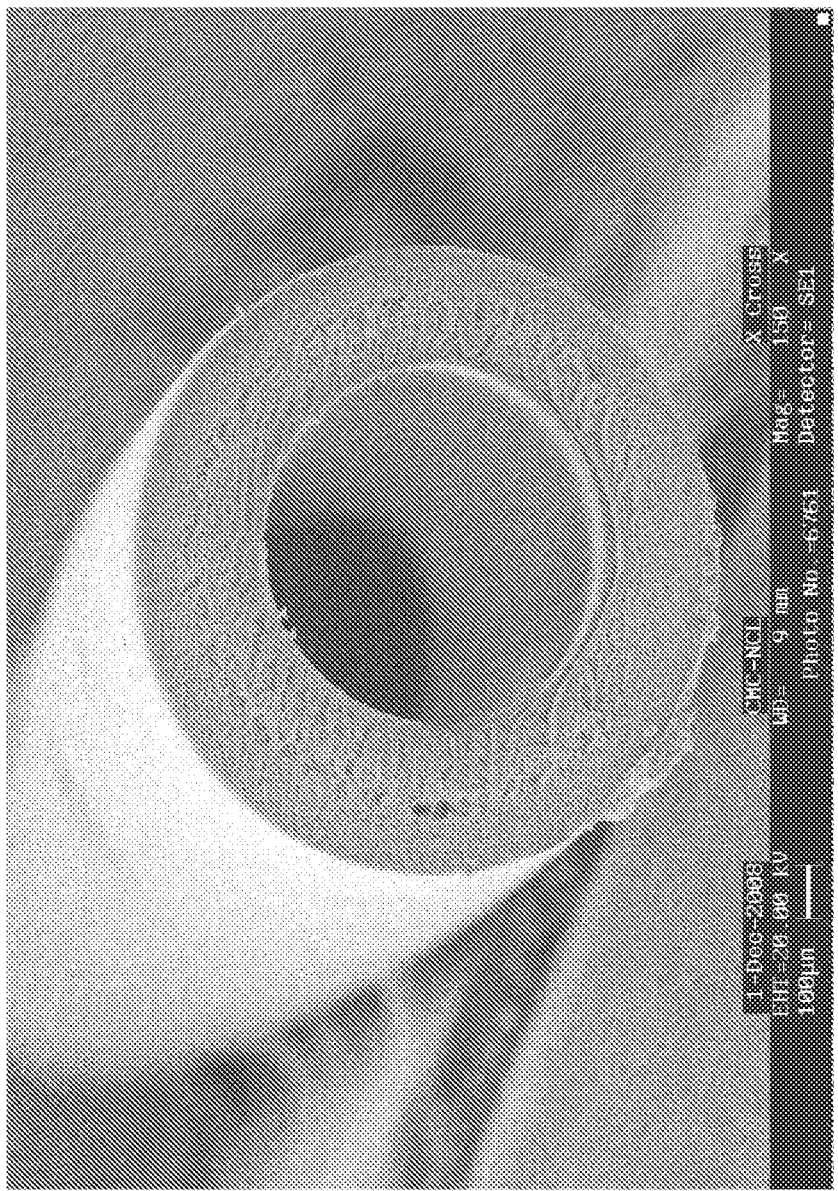

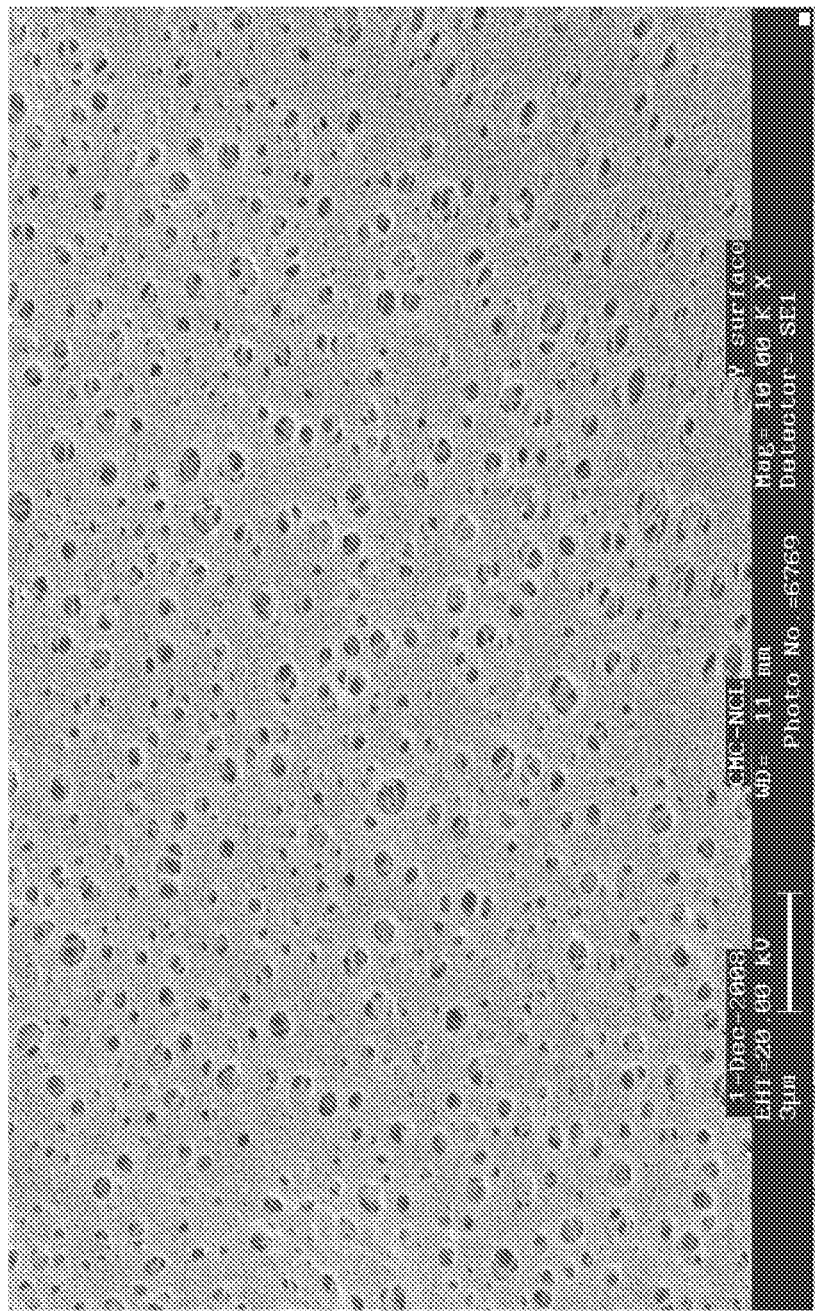
Figure: 2

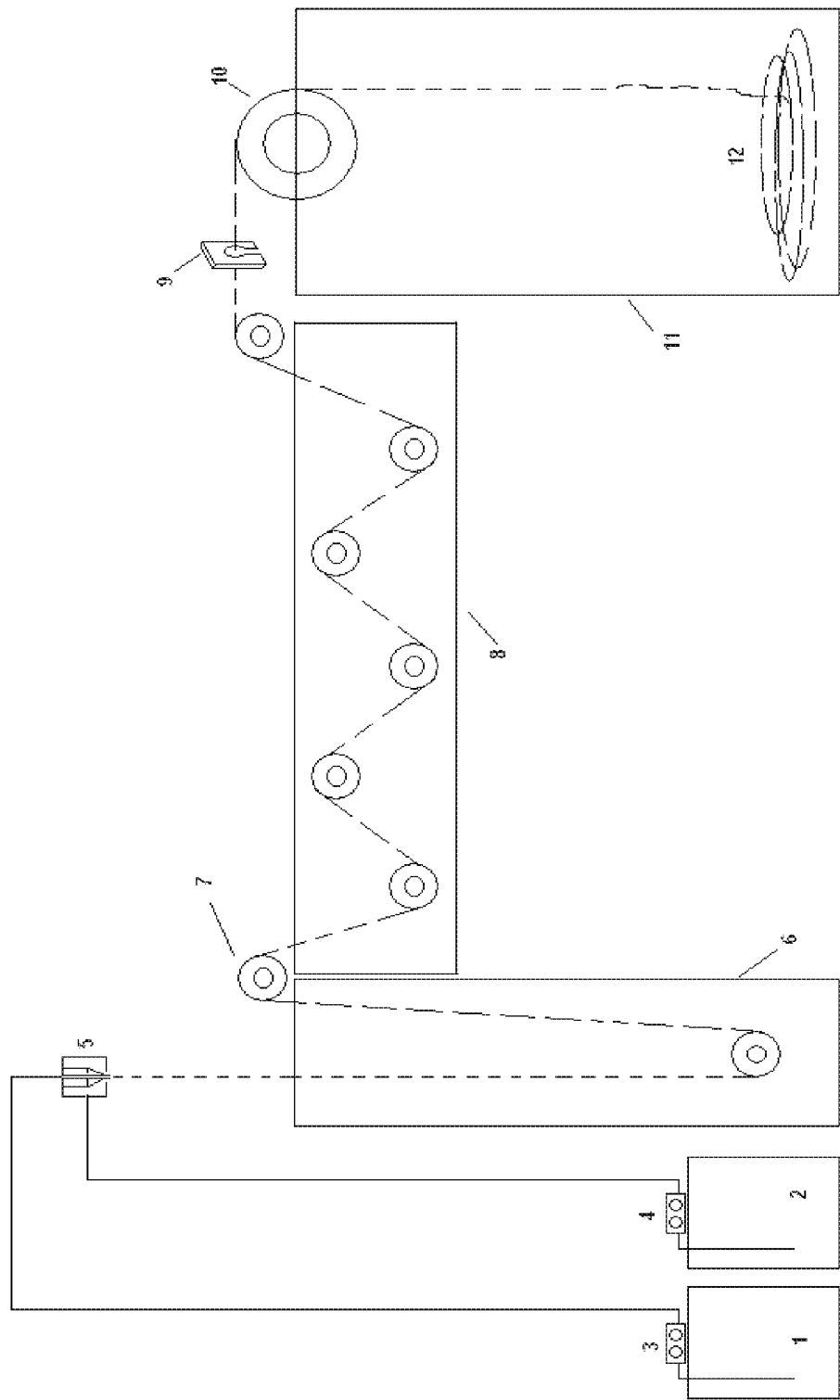
Figure: 3

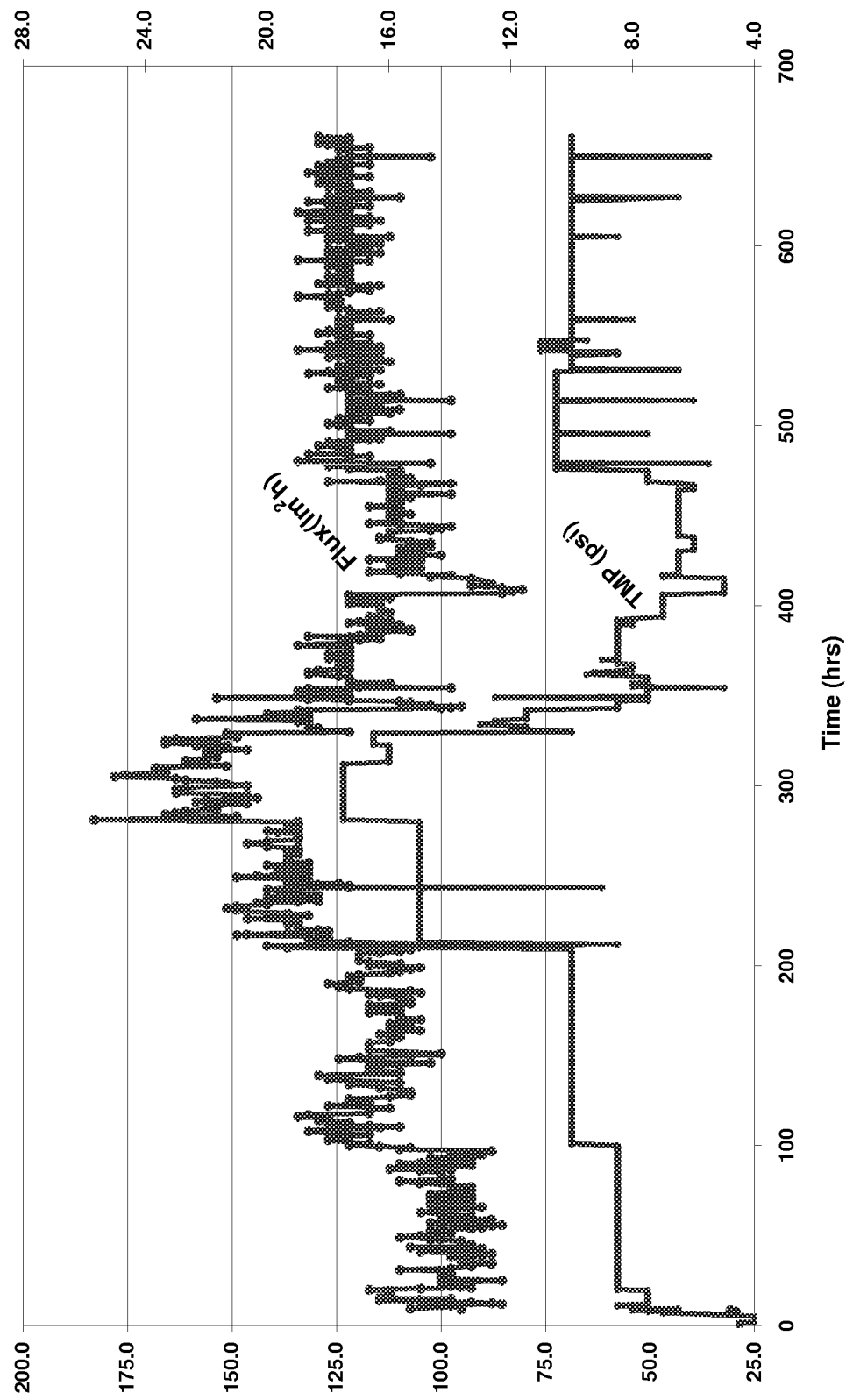
Figure: 4

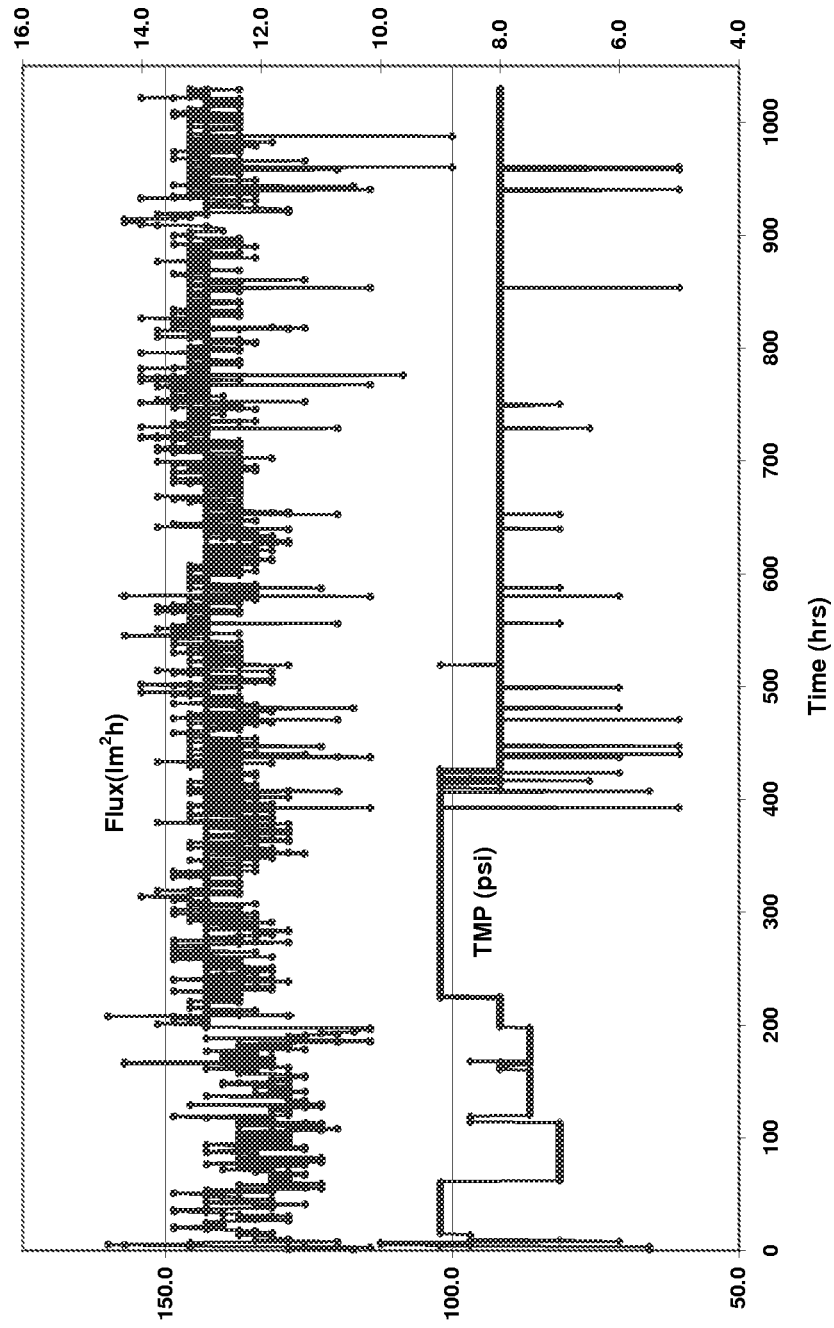
Figure: 5

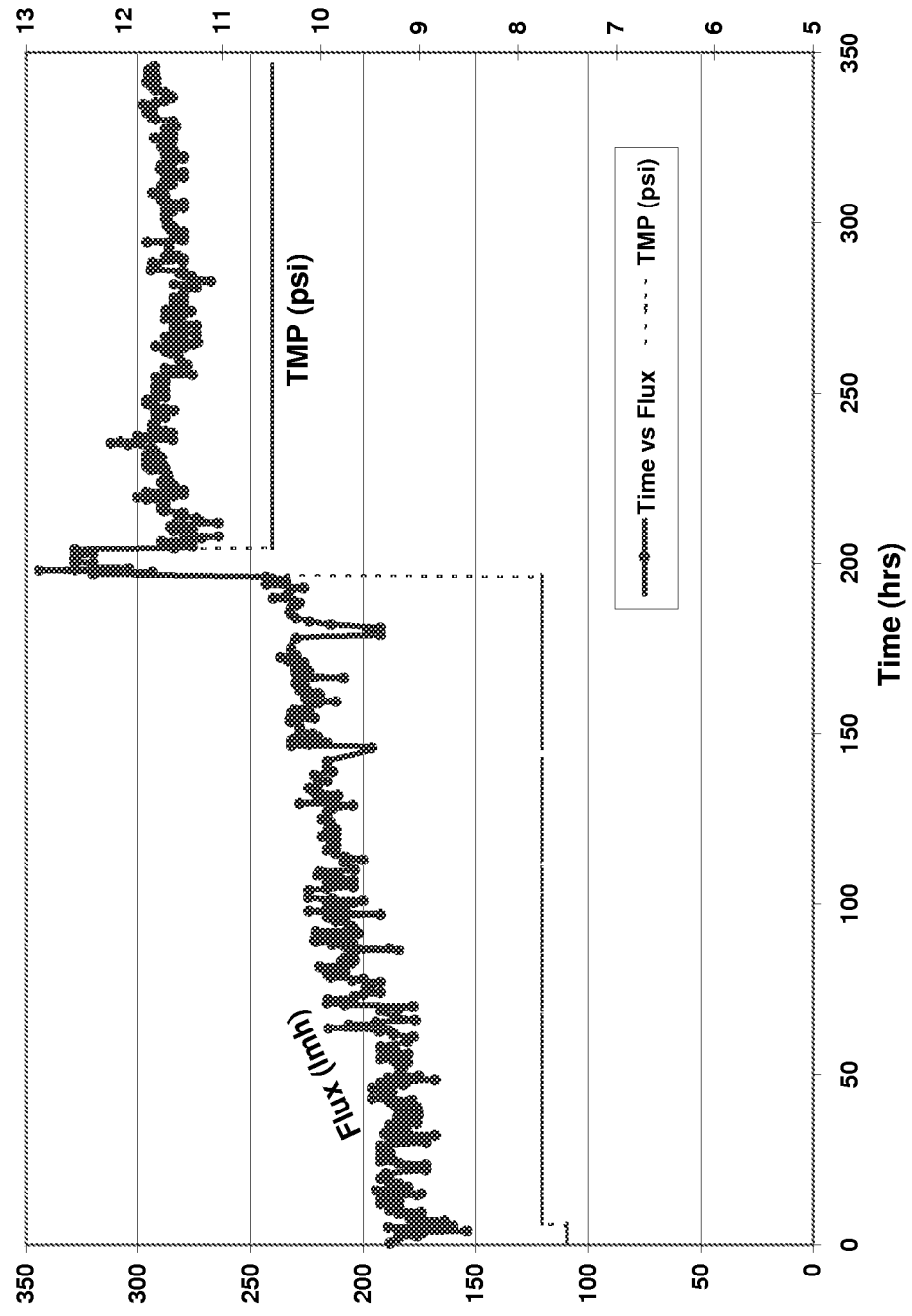
Figure: 6

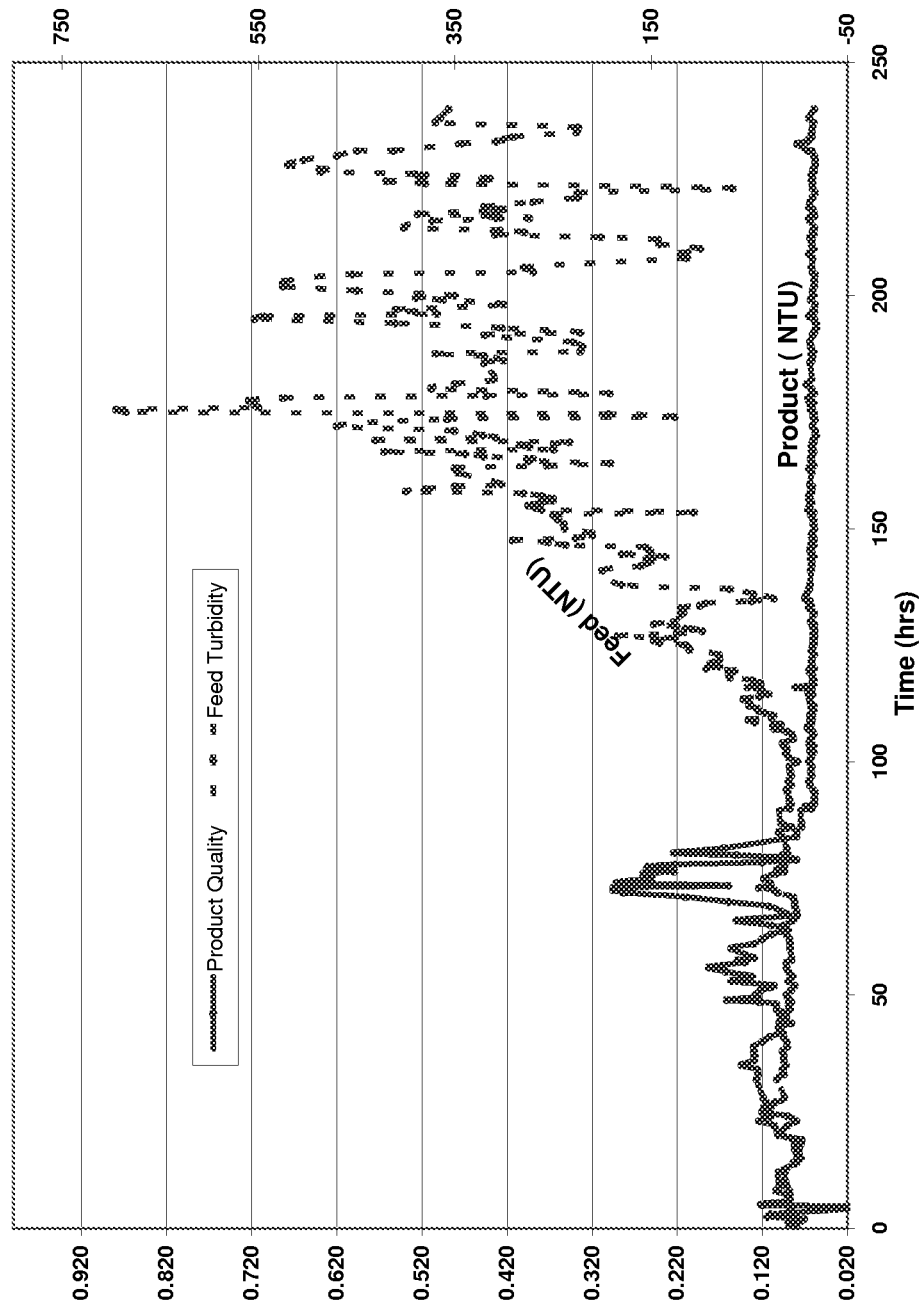
Figure: 7

US 8,424,688 B2

PREPARATION OF HIGH PERFORMANCE ULTRA FILTRATION HOLLOW FIBER MEMBRANE

CROSS-REFERENCE TO RELATED APPLICATIONS

This application is a divisional of U.S. patent application Ser. No. 12/481,909 filed Jun. 10, 2009 which claims priority to Indian Patent Application No. 1369/DEL/2008, filed on Jun. 10, 2008. Each of the foregoing applications is hereby expressly incorporated by reference in its entirety.

BACKGROUND OF THE INVENTION

Embodiments of the present invention relate to a multipolymeric dope solution from which an asymmetric and hydrophilic ultra filtration grade hollow fiber membrane could be made in an environmentally friendly process with recycle of effluent.

BACKGROUND ART

Synthetic membranes are generally used for a variety of applications including desalination, gas separation, bacterial and particle filtration, and dialysis. The properties of the membranes depend on their morphology, i.e., properties such as cross-sectional symmetry or asymmetry, pore sizes, pore shapes and the polymeric material from which the membrane is made. These membranes could be hydrophobic or hydrophilic according to reaction conditions, dope composition, their manufacturing methodologies including post treatment processes. Hydrophilic membranes are less prone to fouling when used in particulate or colloidal suspensions Different pore size membranes are used for different separation processes, ranging progressively from the relatively large pore sizes used in micro filtration, then ultra filtration, nanofiltration, reverse osmosis, and ultimately down to gas separation membranes with pores the size of gas molecules. All these types of filtration are pressure driven processes and are distinguished by the size of the particles or molecules that the membrane is capable of retaining or passing.

Generally, membranes are made by first preparing a casting solution from a chosen polymer formulation and a suitable solvent. In the process of membrane making the polymer is converted into solid phase. Immersing the polymer solution into a quench bath comprising of non-solvent normally carries out precipitation of polymer. Fundamentally phase separation process had been chosen to fabricate these membranes. Three different techniques are involved in a phase separation method:
1. Thermogelation of one or more components mixture,
2. Evaporation of a volatile solvent from two or more components mixture,
3. Addition of one or more non-solvent to a homogeneous polymer solution.

The physical shapes of synthetic membranes can be made in different varieties based on different applications. Flat sheet, tubular or non-reinforced hollow fibers are used in a wide range of areas according to the merit of the specific membrane and application. Hollow fibers are mostly preferred for their high packing density, which provides higher surface areas per unit volume compared to other membrane configurations. The current hollow fiber-based membranes are limited by lower fluxes that can be achieved on a sustainable basis, and also they are limited in terms of turbidity levels, which can be tolerated on a long-term operation.

This invention here is targeted towards overcoming these limitations in the current generation hollow fiber membranes to expand its application for RO pretreatment processes including elimination of media filters and clarifiers even if turbidity conditions are high. It is desired that while high and sustained fluxes are achieved at higher inlet turbidities basic properties of hollow fiber for backwashing and also in terms of burst and elongation strengths are also improved.

It would also be desirable to make the process of spinning hollow fibers less dependent on multiple and small variations like temperature, humidity and need for extremely complex conditions in RO bore fluid composition, Gelation bath composition etc. It is also the target to make the process environmentally friendly by minimizing use of solvent for example in bore fluid, gelation bath air gap for membrane spinning etc and also to recycle most of the water used in the process of spinning.

As a part of this process, the effluent water is contaminated with solvent and traces of PVP. The effluent is processed through a Membrane bioreactor process and all the water is recycled back in to the system to make it an environmentally friendly process.

BRIEF SUMMARY OF THE INVENTION

The present invention relates to a process of making a multi polymeric solution, which can produce of hydrophilic & asymmetric ultra filtration hollow fiber membranes from Polyethersulfone (PES) using two or more different grades of polyvinylpyrrolidone (PVP) in conjunction as additives, water ($H_2O$) as a non-solvent and a suitable solvent from the group of N-methylpyrrolidone (NMP), Dimethylacetamide (DMAc), Dimethylformamide (DMF) and Dimethylsulfoxide (DMSO).

BRIEF DESCRIPTION OF THE SEVERAL VIEWS OF THE FIGURES

FIG. 1 Is a scanning electron microphotograph of the cross section of a hollow fiber membrane obtained from the method of present invention as outlined in trial no. 15.

FIG. 2 Is a scanning electron microphotograph of the outer surface of a hollow fiber membrane obtained from the method of present invention as outlined in trial no. 15.

FIG. 3 Is a schematic diagram of hollow fiber spinning mechanism. The system consists of bore fluid tank (1) fitted with gear pump (3) and spinning reservoir (2) fitted with gear pump (4), both connected to spinneret (5) for feeding bore fluid and dope solution respectively. Gelation bath (6) and casting vat (8) are fitted with guiding pulleys (7) to carry the spun fiber through them, which is pulled by a VFD controlled winding pulley (10). The fiber passes through a laser based dimension-monitoring instrument (9) before being collected (12) into a tank (11) filled with rinse water.

FIG. 4 Is a plot (refer table-IV) showing permeating flux of hollow fiber membranes of the present invention as a function of applied transmembrane pressure.

FIG. 5 Is a plot (refer table-V) showing permeating flux of hollow fiber membranes of the present invention as a function of applied transmembrane pressure.

FIG. 6 Is a plot (refer table-VI) showing permeating flux of hollow fiber membranes of the present invention as a function of applied transmembrane pressure.

FIG. 7 Is a plot (refer table-VII) showing product turbidity of hollow fiber membranes of the present invention as a function of feed water turbidity.

DETAILED DESCRIPTION OF THE INVENTION

Formation of a membrane by phase inversion is very unique and governed by the presence of various components and their concentrations in the composition.

The PVP as an additive tends to reduce the solubility of polymer in the casting solution. This enforces thermodynamic enhancement for phase separation. But at the same time solution viscosity increases, which causes kinetic hindrance for phase separation. Hence a trade-off relationship of thermodynamic enhancement and kinetic hindrance works in a composition with PVP as mentioned above.

Use of low molecular weight PVP (K-30) essentially helps in getting the porosity of the membrane as the hydrophilic PVP tends to mix with the non-solvent water during phase separation and come out of the membrane matrix. As it leaves the PES membrane body surface porosity and cross sectional structure are created. Thin PVP walls between the pores that break upon when membranes are dried create higher interconnectivity. Also a micro phase demixing takes place between PVP and PES, which prevents the formation of the dense top layer.

Presence of the high molecular weight PVP (K-90) is effective in macro void suppression. Macro voids can arise by growth of nuclei at various locations with a high solvent concentration. A growth of macro voids would be more governed by stable polymer solution. During phase separation all other components except the base polymer (here PES) move towards the direction of gelation bath through the nascent fiber body. Thus polymer (PES) rich and polymer lean (PVP) phases are formed enforcing a profound increase of viscosity in the polymer rich phase until solidification occurs, which is considered to be the end of the structure formation process. At the time of solidification the equilibrium composition has not yet been reached and parts of the long chain PVP (K-90) molecules are permanently trapped in the matrix of the polymer. The result of this entrapment is a membrane with a hydrophilic character. Hence the role of PVP (K-90) in the dope is more of a viscosity and hydrophilicity enhancer.

In one embodiment of the invention, the dope includes a first PVP with a molecular weight between 50,000 and 2,000,000, and a second PVP with a molecular weight between 10,000 and 100,000. In a preferred embodiment, a first PVP has a molecular weight between 75,000 and 1,000,000, and the second PVP has a molecular weight between 20,000 to 50,000. In a further embodiment of the invention, the ratio of the amount of first PVP to amount of said second PVP is 1:6, preferably 1:3.

Degassing of polymeric dope is another important process which needs to be consistently performed to eliminate and entrapped air, which could otherwise lead to bubble formation during spinning and film formation. This would result in lack of continuity during spinning and also generate weak spots in the fiber with vulnerability to damage during subsequent usage.

But making polymer dope by using only hydrophilic polymers does not ensure good any uniform cross sectional structure of membrane. As mentioned earlier, growth of macro voids would be more governed by stable polymer solution. Hence to get membranes with very uniform structure and consistent performance, it is desirable to include a fourth component, which makes the dope unstable. Water is one such component, which gives the composition a new dimension to make ultra filtration membrane of enhanced characters. Apart from its technological advantages the amount of water used in the composition also reduces equivalent amount of solvent, which is most desirable from environmental viewpoint.

In a quaternary system there are two different time scales for diffusion. During spinning of fiber when phase inversion takes place at the tip of the spinneret only solvent and non-solvent diffuse through the polymer segments in the initial short time gap, which are fractions of seconds. At this time the interdiffusion of the hydrophobic and hydrophilic polymers are negligible. The two polymers are regarded as freely moving species and the demixing gap is much more expanded at this fraction of a second. This is considered as the equilibrium state and a small amount of water causes fast demixing of the system. The state coincides with the cloud point of the system. The important aspect of this phenomenon is that when the interdiffusion of solvent and non-solvent is rapid compared to the mobility of the polymers then a very thin skin (presumably less than 0.1 micron) surface layer with high polymer concentration is formed.

The addition of water to the composition is intended to take the dope solution very near to the "cloud point" or precipitation point. At this time the composition is very close to a point where any more addition of water, even in very small quantities, will create unstable condition and precipitation will result. Therefore immediately after the fiber comes in contact with central bore fluid (RO water) and before it enters into the gelation bath, the cloud point line could be reached instantaneously. This results in formation of ultrathin skin. If the composition is not close to near cloud point the thin layer will be formed over a period of time probably in varying thicknesses, during the transition through the gelation bath. During this time formation of a secondary skin cannot be eliminated.

When the equilibrium cloud point line is considered, the prepared composition path will lie just inside the demixing gap indicating the occurrence of instantaneous demixing. Hence the concentration of water in the composition is very critical and should be arrived at through series of experiments with water concentration in ascending order and with minimal increment between two successive compositions. Once the clouds or turbidity is visible in a composition, the water concentration of the previous dope could be considered as the boundary line composition provided the solution is clear and transparent. In such way, during phase inversion the typical conditions for delayed demixing will essentially be excluded. A highly porous skin membrane face and uniform cross sectional porous structure without macro voids in the bulk of the polymeric mass behind the skin would be achieved. Also other variables which may impact the saturation of polymer are normalized closed to cloud point and the formulation is ready for precipitation on immediate contact with water.

The combination of these steps in the mechanism, in the quarternary formulation results in achieving a highly porous thin skin separation surface of the membrane. This delivers high water permeability. Because of the Ultra thin skin, the nodular surface roughness is less and the membrane can undertake much higher turbidity in the feed. At the same time suppression of macro voids and comparatively delayed demixing during the structure formation process ensure a uniform, interconnected and spongy or finger type polymer network behind the thin skin. This ensures good mechanical strength of the fibers with respect to stretchability, tensile strength and burst strength (refer SEM images and results in table-III). All these parameters are important for fiber membranes to withstand the rugged conditions of water and wastewater filtration operating conditions for a prolonged period.

Peripheral conditions during the spinning process are also very important and critical to define the character of the fibers. The bore fluid type & flow, gelation bath and casting vat (refer FIG. 3) fluid compositions are all very important in the process of spinning. This would become apparent to those skilled in the art upon examination or may be learned from the practice of the invention.

RO grade water as bore fluid has been selected in the present invention where as it has been tried with a mixture of solvent and water in various prior arts. Use of solvent in the coagulating medium delays the demixing process often results in large pores on the coarser side of the membrane. But it not only demands huge amount of solvent but also poses issues related to disposal of waste. Unwarranted use of solvent only adds to the complexity of effluent discharge or treatment. Hence Gelation bath & Casting vat fluid used in the present invention is RO grade water with pH raised to anything between 9.0 to 11.0.

Raising pH enhances the separation of solvent through the outer surface more efficiently. Once the thin skin is formed in the internal body and the nascent fiber passes through the free air gap, a process of solvent movement towards the periphery starts. A solvent rich phase exists on the body of the nascent fiber when it enters into the gelation bath. There is a possibility of blockage of solvent movement if a secondary and coarser skin is formed on the outer surface of the fiber. Presence of solvent for prolonged time could be detrimental to the desired character of the fiber, as it tends to make inroads into the vitrified polymer again. High pH conditions with the aid of sodium hydroxide almost rules out this possibility and keeps the outer pores open to facilitate solvent removal.

Temperature of casting vat fluid is maintained between 25 and 50 deg C. All synthetic membranes tend to constrict under cold conditions, especially when those are in semi cure state. Keeping the temperature little over normal always helps to protect the fibers from possible contraction, which could lead to disastrous pore collapse. Hence both high pH and little over normal temperature conditions help in driving out most of the solvent within gelation bath and casting vat ensuring uniform and interlinked porosity that generates desired hydraulic and mechanical properties of the fibers.

The membranes made in this process do not include any charged polymeric compounds or any chemical additives which have adsorption properties, as the base ultra filtration duty (to provide consistent high flux and turbidity) results does not require these features.

Membranes obtained by phase inversion of a polymer solution may contain substantial amounts of the superficial PVP, which are not an integral part of membrane structure. To overcome this problem membranes are treated with sodium hypochlorite. By treating UF membranes of PES/PVP with NaOCl solution, membranes with higher flux and reduced superficial PVP content were obtained. Reaction of PVP with NaOCl causes ring opening of the pyrrolidone ring of the PVP molecule. In this reaction PVP is oxidized in alkaline solution. NaOCl is a non-specific oxidizing agent and its activity strongly depends on the pH of the reaction medium. The reaction between PVP in alkaline media can take place by opening of the pyrrolidone ring to the form γ-amino acid units. The mechanism of this reaction is shown in the below scheme.

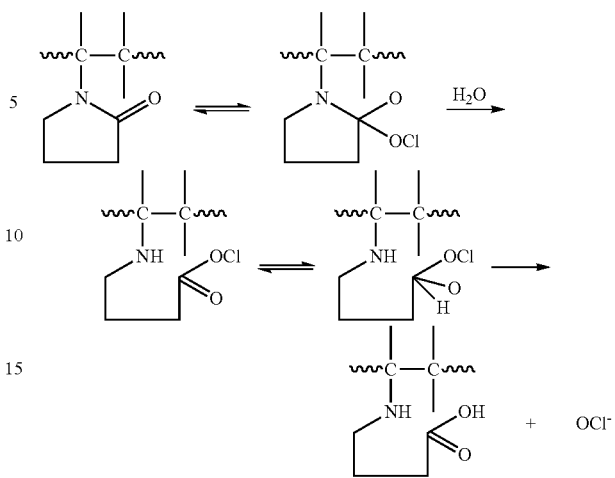

Hence the PVP molecules, which are not within the network of the polymer and reside in the void areas, are subject to hypochlorite treatment to ensure high water permeability. Membranes as described herein may offer one or more of the following advantages:

1—Achieved enhanced porosity and hydrophilicity at the same time by using two different types of water-soluble polymers. (Refer table II & IV given below)
2—Achieved high flux membranes by using a quaternary system comprising of hydrophobic polymer, hydrophilic polymers, water and solvent to seize advantages of each component. (Refer table III given below)
3—The membrane formed is stable and show consistency in characteristics even after a long time gap. (Refer table IV & V given below)
4—The structure uniformity with repeatability is observed resulting good mechanical and hydraulic characteristics (Refer table III & SEM photographs given below)
5—This composition could be spun into fibers of different dimensions. Fibers with very small bore could provide more membrane surface area and fibers with larger diameters could be used to treat water with higher turbidities with continuous higher fluxes without any symptoms of permanent fouling. (Refer table VI & VII below)
6—One advantage of the polymer dope and the fiber membrane making process discussed herein is that the process is simple, environment friendly and not dependent on multiple variables like creation of solvent vapors in the air gap, mixing solvent in gelation bath, multiple casting, vat, etc. as used in many prior arts. Moreover the formulation is normalized net of all variables at cloud point conditions and ready for spinning to deliver high performance membranes.

Ingredients & Reaction Process

Several suitable polymers (both hydrophobic & hydrophilic) are available and can be used within embodiments of this invention. Other factors can combine with the kind and concentration of the polymer to affect the stability of the dope mix. Such factors include solvents or their mixtures, nonsolvents or their mixtures, and casting temperatures. The following are some of the materials which have been found useful in the practice of this invention, but it will be clear to those skilled in the art that many others and/or their combinations may also be used.

A particularly preferred polyethersulfone polymer for use in the presently claimed invention is ULTRASON® E-6020P.

Again particularly preferred water-soluble polyvinylpyrrolidone polymers for use in the presently claimed invention are KOLLIDON® (K-30) & KOLLIDON® (K-90).

Particularly preferred solvents for use in the presently claimed invention are N-methylpyrrolidone (NMP) and/or Dimethylacetamide (DMAc). An exemplary production process comprises the steps of:

1. About 75% of the total required amount of solvent and water (entire quantity) to be charged in a reactor (suitable for the solvent) and mixed by means of an anchor type agitator.
2. Required concentration of the solvent for a batch could be anything between 50% to 90%. Preferably it is between 60% to 80%
3. Required quantity of water would be depending on the cloud point evaluation, which could vary batch to batch. Preferably it should be between 5.0% to 10.0% for a batch of dope.
4. For every new batch of polymer the cloud point should be evaluated. A series of sample reactions should be set added with all polymers in their respective quantities and water in progressive quantities within the range of cloud point. The absolute clear and turbid solution should be picked for cloud point determination. Within that range of water concentration a new set of experiment should be carried out with narrower range of water quantity. Selected dope should be devoid of any turbidity but very near to that.
5. One of the additives, here in the form of PVP (K-90) to be added to the above solution and agitated at room temperature until complete dissolution.
6. Required quantity of PVP (K-90) for a batch could be between 0.5% to 5.0%. Preferably is between 1.0% to 3.0%
7. Other additive in the form of PVP (K-30) to be added to the above solution and agitated at room temperature till complete dissolution.
8. The quantity of PVP (K-30) for a batch could be between 1.0% to 15.0%. Preferably it is between 5.0% to 10.0%
9. Another 10% of the total solvent quantity is to be added at this stage.
10. Required amount of PES should be added in small portions at regular intervals ensuring uniform dispersion.
11. Required quantity of PES in a batch could be between 5.0% to 40.0%. Preferably it is between 15.0% to 25.0%
12. Once the entire PES quantity is added, then the remaining of the solvent is to be added and mixed.
13. Agitation should continue during addition and thereafter. Linear speed of the agitator could be anything between 2000 to 4000 cm/min.
14. Reaction continues for several hours, which could be 5 to 50 hours depending on achieving a consistent viscosity; preferably it should be between 15 to 35 hours.
15. Temperature of the reaction to be maintained between 10° C. to 50° C. Preferably is to be between 20° C. to 40° C.
16. At the end of the reaction a transparent and homogeneous solution will be achieved with viscosity between, 2000 cps to 30,000 cps, preferably between 5,000 cps to 15,000 cps.
17. The solution in spinning reservoir is then degassed by means of a vacuum pump @ 700 to 760 mmHG for several hours, preferably from 24 to 48 hours ensuring all tiny air bubbles are removed from the viscous solution.
18. Temperature of the solution during degasification should be maintained between 15° C. to 40° C., preferably from 20° C. to 30° C.
19. Conditions to be set for HF as,
    a. The spinning reservoir then is mounted on a spinning mechanism fitted with a concentric orifice spinneret, coagulation bath, casting vat and motorized winding pulley.
    b. Spinneret needle internal/external diameter and the annular gap diameter are fixed with respect to the required fiber dimensions.
    c. Gelation bath and casting vat have to be filled with reverse osmosis grade water free of particles and colloids.
    d. Both gelation bath and casting vat water should be adjusted for pH value of anything between 9.0 to 11.0.
    e. Both gelation bath and casting vat water should be adjusted for temperature most preferably between 25° C. to 50° C.
    f. Air gap between the spinneret tip and the water level in the gelation bath is maintained between 15 cms to 100 cms, preferably between 30 cm to 80 cm as per control requirements during spinning.
    g. The humidity of the air gap could be anything between 30% to 90% more preferably between 40% to 70%.
    h. The central bore fluid is essentially Reverse osmosis permeate water pumped through a gear pump at the rate of anything between 1 to 50 ml/min, most preferably between 5 to 35 ml/min.
    i. The polymer dope is extruded through the spinneret annular orifice by means of either $N_2$ gas or a suitable gear pump at a rate of anything between 10 to 50 gm/min.
    j. Spun fibers are collected in bundles of predetermined length and rinsed with flowing reverse osmosis (RO) water for at 12-48 hours.
20. The fibers are post treated after the above rinsing, sodium hypochlorite most preferably for duration of 5 to 25 hours.
21. The free $Cl_2$ concentration of the post treatment solution should be preferably between 0.1% to 0.5%.
22. The pH value of the said post treatment solution should be anything between 8.0 to 12.0.
23. Membranes should be rinsed thoroughly with RO permeate water after the post treatment to remove traces of free chlorine from its structure.
24. Finally the Membranes should be preserved in glycerol and sodium bisulphite solution in an airtight container.

It should be noted that the calculation and subsequent use of the cloud point to create the fiber dope allows creation of a membrane with properties that the applicants believe to be more suitable for water purification in waters with high turbidity than those that may be provided by the art. For example, United States Patent Application Publication No. 2009/0057225, to Krause, et al, reports creation of fiber membranes with differing structures and properties. Those membranes, which are optimized for small diameter, DNA particle removal, have smaller inner and outer diameters (214 micrometers inner diameter and 312 micrometers outer diameter, compared to a range of between 0.6 to 1.6 mm inner diameter and 0.9 to 2.5 mm outer diameter for preferred embodiments of the invention), and lack the ability to accept high turbidity waters and then deliver product water with a turbidity of less than 0.1 NM.

One also notes that Krause's membranes are described as useful only for DNA separation, and are not likely to be suitable for high dimension necessary for water and wastewater filtration with high turbidity input. Krause reports that the most beneficial membranes will include a cationically-charged polymer; this is different from embodiments of the current invention, in which a cationically charged polymer is usually not necessary and in many cases not desired.

Krause also does not teach or suggest creation of a membrane that has been treated with NaOCl (sodium hypochlorite). This means that the membrane resulting from Krause could have significant presence of superficial PVP, which leads to suboptimal flux results. Furthermore, the use of polyamide that is suggested by Krause may be omitted in embodiments of the instant invention.

Another difference between embodiments of the instant invention and membranes as reported in Krause is the use of reverse-osmosis (RO) water. Those skilled in the art will recognize that RO-quality water is presumed to include no particles of diameter greater than 0.1 nm. RO water is used in embodiments of the instant invention for the fluid in the central bore that is excluded through the inner opening of the spinning nozzle. This is markedly different from Krause, in which the center fluid requires 30 to 55% solvent and may include 0.1 to 2% polymer. Krause also provides hydrophobic absorption domains in its primary embodiment, while the membranes of embodiments of the invention are hydrophilic and typically have a moisture content between 3 and 10%.

The process used by those following Krause is also significantly different. Krause requires between 2 and 2.6% of water in the dope, while preferred embodiments of the instant invention require about 5% to about 10% to move the composition to the cloud point. Krause also does not discuss degasification of the polymer dope, leading to the potential for air bubbles and a resulting less strong membrane.

EXAMPLES

Many experiments were carried out before arriving at the composition suitable for producing the said hydrophilic asymmetric ultra filtration hollow fiber membrane with superior permeability and rejection characters. Some of those dope making & spinning experiments are given below as examples. The examples are not meant in any way to limit the scope of this invention.

Example 1

Set (PES+PVP: K-30+Solvent)

In this set of experiments only PVP: K-30, PES and solvent were used. Presented in this example are certain compositions, where 15 to 25% of PES, 5 to 10% of PVP: K-30 and 60 to 80% of solvent were used. Reaction procedures were as per the procedure mentioned above in section 6.0. Only the clear and stable solutions were taken for spinning trials.

TABLE I

| | | | | Fiber characteristics: | | | | |
|---|---|---|---|---|---|---|---|---|
| Trials | Viscosity of the dope (Cps) | OD (mm) | ID (mm) | Mass/unit length Gm/m2 | Elongation (%) | Moisture (%) | Flux lm$^2$h @ 20 psig | Burst Strength Kg/cm2 |
| 1 | 14,470 | 1.0 | 0.72 | 0.1451 | 50 | 8.6 | 50-70 | 6.2 |
| 2 | 15,500 | 0.95 | 0.67 | 0.1505 | 60 | 6.0 | 90-100 | — |
| 3 | 12,560 | 1.0 | 0.70 | 0.1546 | — | 8.4 | 50-60 | 5.6 |
| 4 | 9,160 | 1.2 | 0.82 | 0.1454 | 6.0 | 2.5 | 300-350 | — |

1$^{st}$ Set Observations:

All moisture content figures in the above (1 to 4) were found to be temporary and after 40-50 hours of RO water permeation testing the values came down to <1.0%. Hence the hydrophilicity was only temporary and unsustainable. Pure water flux values were by and large very less. Strength of fiber was low as shown in the table as burst strength results. These examples were a few from innumerable similar compositions with variation in their concentrations. But these were the best of results achieved with a specific ratio of PES & PVP.

Example 2

Set (PES+PVP: K-30+PVP: K-90+Solvent)

In this set of experiments both PVP: K-30 and K-90 were used along with, PES and solvent. A few of the various compositions tried are given here, where 15 to 25% of PES, 5 to 10% of PVP: K-30, 1 to 3% PVP: K-90 and 60 to 80% of solvent were used. Reaction procedures were same as the procedure mentioned above in section 6.0. Only the clear and stable solutions were taken for spinning trials.

TABLE II

| | | | | Fiber characteristics: | | | | |
|---|---|---|---|---|---|---|---|---|
| Trials | Viscosity of the dope (Cps) | OD (mm) | ID (mm) | Mass/unit length Gm/m2 | Elongation (%) | Moisture (%) | Flux lm$^2$h @ 20 psig | Burst Strength Kg/cm2 |
| 5 | 16,900 | 1.32 | 0.86 | 0.2126 | 5.0 | 2.0 | 400-500 | |
| 6 | 14,120 | 1.27 | 0.75 | 0.2281 | <5.0 | 3.2 | 500-600 | 4.6 |
| 7 | 11,800 | 1.20 | 0.85 | 0.1367 | 5.0 | 2.6 | 500-600 | |
| 8 | 11,700 | 1.14 | 0.76 | 0.1318 | <5.0 | 2.4 | 400-500 | 3.5 |

2nd Set Observations:

Inclusion of high molecular weight PVP, K-90 could bring about some sustainable hydrophilicity but the physical strengths with respect to burst strength and elongation were below desired level. Flux values were mediocre and mostly below 500 lm² h. The above cases (table: II) are the best amongst so many, which could be achieved with a specific PES/PVP ratio similar to that of 1st set experiments Example 3

Set (PES+PVP: K-30+PVP: K-90+Water+Solvent)

In this set of experiments all ingredients e.g. water, PVP: K-30, K-90, PES and solvent were used in the compositions. First the cloud point boundary line was found through series of experiments conducted with varied concentrations of water. The nearest clear solution of the cloud point turbid solution was always taken for spinning. This set presents selected examples where 15 to 25% of PES, 5 to 10% of PVP: K-30, 1 to 3% of K-90, 2 to 10% of water and 60 to 80% of solvent were used. Reaction procedures were same as the procedure mentioned above in section 6.0. Only the clear and stable solutions were taken for spinning trials.

ary line of precipitation. As a result both mechanical strength (elongation and burst strength) and pure water permeability were below per. Basic intent of using water in the dope was to accomplish near saturation state. Unless the water quantity reaches that level it does not help to get better membranes.

At this stage cloud point experiments were conducted and series of dope compositions were made with already defined PES and both PVP concentration. Ascending order of water concentration in the series brought out the precipitation line, where solution turned turbid. After a few more confirmatory tests the concentration of water was decided to be marginally less than the concentration that brings cloud point. It was observed that water concentration below 5% did not show good results. Trials from 12 to 18 were conducted with that specific concentration of water (in between 5 to 10%) in the dope, which gives clear and transparent solution but quickly turns turbid when exposed to moist environment. Results improved (except 12A because of absence of NaOCl treatment) and necessary quality and performance parameters were achieved after incorporating cloud point conditions.

TABLE III

| Trials | Viscosity of the dope (cps) | OD (mm) | ID (mm) | Mass/unit length Gm/m2 | Elongation (%) | Moisture (%) | Tensile strength MPa | Flux lm²h @ 20 psig | Burst Strength Kg/cm2 |
|---|---|---|---|---|---|---|---|---|---|
| | | | | | Fiber characteristics: | | | | |
| 9 | 6,500 | 1.15 | 0.75 | 0.1352 | 20 | 6.1 | | 80-100 | 5.2 |
| 10 | 12,000 | 1.19 | 0.80 | 0.1738 | 10.0 | 3.44 | | 300-350 | 6.8 |
| 11 | 8,000 | 1.04 | 0.72 | 0.1283 | 8.0 | 3.20 | | 300-400 | 6.7 |
| 12 | 7,330 | 1.22 | 0.79 | 0.1715 | 44 | 5.1 | 3.61 | 600-700 | 8.0 |
| 12A | Results without NaOCl treatment | | | 0.1821 | 48 | 6.3 | | 200-250 | 8.2 |
| 13 | 13,600 | 1.20 | 0.82 | 0.1650 | 29.0 | 5.60 | 2.5-4.1 | 800-1000 | 7.5 |
| 14 | 12,200 | 1.24 | 0.78 | 0.1983 | 32.0 | 13.0 | 3.4-3.5 | 600-700 | 7.8 |
| 15 | 12,300 | 1.27 | 0.75 | 0.1957 | 24.0 | 10.0 | 2.5-3.5 | 700-800 | 7.5 |
| 16 | 6,790 | 1.25 | 0.78 | 0.1804 | 44.0 | 3.00 | 3.1-4.5 | 600-700 | 8.0 |
| 17 | 9,480 | 1.23 | 0.78 | 0.1665 | 44.0 | 4.90 | 4.3-4.5 | 700-800 | 8.2 |
| 18 | 7,320 | 1.23 | 0.76 | 0.1723 | 40.0 | 8.00 | 3.4-4.5 | 800-900 | 7.5 |

3rd Set Observations:

Water was introduced into the composition in this set of experiments. But in the initial results (refer trials 9, 10 & 11) mechanical strength and/or water permeability were not very promising. The reason was the concentration of water in the dope. Optimization of water quantity with respect to cloud point line was yet not arrived at in these formulations. Water concentration was either less or not perfectly near the bound- Example 4

Set: 8" Diameter Module Testing

One 200 mm diameter×1500 mm length prototype hollow fiber module (made of fibers from Example-12 above) was operated for almost 700 hours at different conditions. Here fiber membranes were regular i.e 0.80 mm ID. Membrane surface area was 41 m² (441 ft²). A performance summary is given in table-VII.

TABLE IV

Performance Summary of Hollow Fiber Module: AMP 0908-09
Total Operational Period: About 700 hours

| At TMP psig | Operational duration hours | Avg Flux range $Lm^2h$ | Feed Turbidity NTU | Product Turbidity NTU | Product SDI | BW TMP psig | BW Flux $LM^2H$ |
|---|---|---|---|---|---|---|---|
| 5 to 8 | ~120 | 80-110 | Up to 5.0 | <0.070 | <1.50 | 10-20 | 150-200 |
| 8 to 10 | ~330 | 110-130 | Up to 5.0 | <0.075 | <1.50 | 15-20 | 180-200 |
| 10 to 15 | ~150 | 120-140 | Up to 5.0 | <0.075 | <1.70 | 20 | 200-210 |
| 15 & above | ~50 | 140-180 | Up to 5.0 | <0.075 | <1.90 | 20 | 200-210 |

4$^{th}$ Set Observations:

This was the first module. With moderate turbidity load (~5 NTU), flux values were well above 100 lmh and reached 125 lmh with little higher transmembrane pressure for a prolonged period for 700 hours.

Example 5

Set: 8" Diameter Module Testing

Another 200 mm diameter×1500 mm length prototype hollow fiber module (using similar dope as mentioned, refer Trial-16 above) was operated for more than 700 hours at different conditions. In this case fiber membranes were of higher diameter (ID: 1.30 mm) Membrane surface are was 35 m$^2$ (375 ft$^2$). A performance summary is given in table-V.

TABLE V

Performance Summary of Hollow Fiber Module: AMP 1008-01-HD
Total Operational Period: About 1000 hours

| At TMP psig | Operational duration hours | Avg Flux range $Lm^2h$ | Feed Turbidity NTU | Product Turbidity NTU | Product SDI | BW TMP psig | BW Flux $LM^2H$ |
|---|---|---|---|---|---|---|---|
| 5 to 8 | ~780 | 120-150 | Up to 5.0 | <0.075 | <1.50 | 20 | 260-280 |
| 8 to 10 | ~250 | 140-160 | Up to 10.0 | <0.075 | <1.50 | 20 | 260-280 |

5$^{th}$ Set Observations:

This was operated for more than 1000 hours. Turbidity load was taken to 10 NTU at times. Product quality was very consistent (SDI: <1.50) with about 150 lmh flux throughout the operation period.

Example 6

Set: 4" Diameter Module Testing

Another 100 mm diameter×1300 mm length prototype hollow fiber module (using similar dope as mentioned refer Example-15 above) was operated for more than 350 hours at high turbidity conditions up to 200 NTU. Higher dimension fiber membrane surface area was 4.5 m² (48.4 ft²). A performance summary is given in table-VI

TABLE VI

Performance Summary of Hollow Fiber Module: AMP 0908-HD-III
Total Operational Period: About 350 hours

| At TMP psig | Operational duration hours | Avg Flux range Lm²h | Feed Turbidity NTU | Product Turbidity NTU | Product SDI | BW TMP psig | BW Flux LM²H |
|---|---|---|---|---|---|---|---|
| 7 to 8 | ~200 | 180-250 | 50 to 200 | <0.070 | <1.50 | 10 to 20 | 350-700 |
| 10 to 12 | ~150 | 250-300 | Up to 5.0 | <0.070 | <1.50 | 20 | 600-700 |

6th Set Observations:

Turbidity load was taken upto to 200 NTU, where 200-250 lmh flux could be achieved. When turbidity load was brought down to ~5 NTU, the flux achieved was even higher (300 lmh)

Example 7

Set: 4" Diameter Module Testing

Another 100 mm diameter×1000 mm length prototype hollow fiber module (using similar dope as mentioned refer Example-11 above) was operated for about 250 hours at high turbidity conditions up to 700 NTU. Higher dimension fiber membrane surface area was 3.5 m² (37.6 ft²). A performance summary is given in table-VII

TABLE VII

Performance Summary of Hollow Fiber Module: AMP 0808-HD-01
Total Operational Period: About 250 hours

| At TMP psig | Operational duration Hours | Avg Flux range Lm²h | Feed Turbidity NTU | Product Turbidity NTU | Product SDI | BW TMP psig | BW Flux LM²H |
|---|---|---|---|---|---|---|---|
| 9 to 10 | ~150 | 150-160 | 10 to 100 | <0.070 | <2.0 | 10 to 15 | 250-400 |
| 15 to 16 | ~100 | 150-250 | 200 to 700 | <0.070 | <2.0 | 20 to 25 | 300-450 |

7th Set Observations:

This module was tested in very rugged conditions like turbidity as high as 700 NTU. But the product quality remained less than 0.070 NTU (<2.0 SDI) with flux values as high as 250 lmh.

Effluent Treatment & Recycle:

The process of dope preparation and spinning fiber of the present invention generates some effluent water enriched with the solvent which is selected from the group of N-methylpyrrolidone (NMP), Dimethylacetamide (DMAc), Dimethylformamide (DMF) and Dimethylsulfoxide (DMSO). These organic solvents and a small concentration of PVP, which come out in the gelation and rinsing units during spinning are highly biodegradable. It is highly desirable to remove the trace solvent from the effluent and reuse the water in the process. A biological reactor with active microorganism work well to break the organic solvents in the effluent and produce clean water continuously.

A novel membrane bioreactor process has been developed in the laboratory for treatment and recycle of this effluent. High MLSS (mixed liquid suspended solid) and low HRT (hydraulic retention time) of a membrane bioreactor enhances the treatment process and rejects 90-95% of COD & BOD generated by the organic contaminants. Solvent concentration as high as 0.10% has been successfully tested in laboratory MBR units under high MLSS conditions. About 10,000 to 15,000 mg/l active solids were maintained in the bioreactor. Hydraulic retention time (HRT) was maintained at more or less than a day. COD & BOD values as high as 1500 mg/l & 500 mg/l created by the presence of solvent could be degraded in the system and produce RO feed grade water. Given below a summarized operational & analytical data of the small laboratory bioreactor trial, which was conducted for about 500 hours.

TABLE VIII

| Hours | Flux LMH | Prod Turbidity NTU | DO (mg/lIt) | MLSS (mg/lit) | F/M Ratio | HRT Day | SRT Day | Solvent Conc. mg/lit | COD (mg/l) FEED | COD (mg/l) PROD | COD (mg/l) REJ (%) | BOD (mg/l) FEED | BOD (mg/l) PROD | BOD (mg/l) REJ (%) |
|---|---|---|---|---|---|---|---|---|---|---|---|---|---|---|
| 1 | 13.14 | 0.171 | 0.91 | 11160 | 0.115 | 0.9 | 4.0 | 1000 | 1200 | 30 | 97.5 | | | |
| 18 | 13.71 | 0.138 | 1.36 | 12040 | 0.073 | 1.5 | 6.1 | 1000 | 1300 | 10 | 99.2 | 315 | 4.5 | 98.5 |
| 28 | 12.86 | 0.134 | 2.87 | 11640 | 0.067 | 1.7 | 6.5 | 1000 | | | | | | |
| 38 | 11.43 | 0.148 | 1.86 | 9480 | 0.127 | 1.4 | 4.2 | 1000 | 1700 | 90 | 94.7 | | | |
| 51 | 12.57 | 0.190 | 2.09 | 10440 | | 1.7 | 5.6 | 1000 | | | | | | |
| 61 | 11.43 | 0.171 | | | | 2.7 | | 1000 | | | | | | |
| 68 | 12.20 | 0.194 | | 7080 | 0.155 | 1.3 | 3.6 | 1000 | 1400 | 110 | 92.1 | | | |
| 82 | 13.43 | 0.178 | | 9480 | 0.19 | 0.8 | | 1000 | 1400 | 130 | 90.7 | | | |
| 103 | 12.29 | 0.157 | | 7520 | 0 | 0.8 | 2.9 | 1000 | | | | | | |
| 124 | 12.86 | 0.164 | | 11360 | 0.097 | 1.4 | | 1000 | | | | | | |
| 136 | 13.14 | 0.219 | 0.34 | 9560 | 0.074 | 1.6 | 3.9 | 1000 | | | | | | |
| 147 | 11.43 | 0.184 | 0.86 | 9240 | | 1.2 | 3.5 | 1000 | | | | | | |
| 165 | 12.0 | 0.189 | | | | 1.5 | | 1000 | | | | | | |
| 185 | 13.43 | 0.262 | 0.13 | 9840 | 0.154 | 0.9 | 3.8 | 1000 | 1400 | 140 | 90.0 | 260 | 21.5 | 91.7 |
| 196 | 12.86 | 0.148 | 0.72 | 12440 | 0.119 | 0.8 | 5.0 | 1000 | 1200 | 300 | 75.0 | | | |
| 218 | 12.57 | 0.432 | 0.48 | 15880 | | 1.5 | 6.7 | 1000 | | | | | | |
| 233 | 10.64 | 0.256 | | | | 0.9 | | 1000 | | | | | | |
| 252 | 10.29 | 0.292 | | 14520 | | 1.4 | 15.0 | 1000 | | | | | | |
| 270 | 11.71 | 0.371 | 0.46 | 10010 | | 1 | 7.9 | 1000 | | | | | | |
| 291 | 10.57 | 0.173 | 1.32 | 9840 | 0.093 | 1.1 | 7.5 | 1000 | 1000 | | 100.0 | | | |
| 310 | 10.0 | 0.384 | 0.74 | 11000 | | 1 | 4.0 | 1000 | | | | | | |
| 321 | 6.86 | 0.184 | 1.62 | 10320 | 0.08 | 1.7 | 4.1 | 1000 | 1400 | 100 | 92.9 | | | |
| 342 | 7.43 | 0.164 | 1.32 | 10480 | 0.06 | 2.4 | 6.5 | 1000 | 1500 | 80 | 94.7 | | | |
| 357 | 7.43 | 0.260 | 0.63 | 10080 | 0.08 | 1.4 | 4.2 | 1000 | | | | | | |
| 363 | 6.29 | 0.279 | 0.84 | 12320 | | 2.3 | 5.6 | 1000 | | | | | | |
| 372 | 5.71 | 0.278 | | 10480 | | 6 | 6.0 | 1000 | | | | | | |
| 393 | 6.29 | 0.418 | 0.24 | | | 3.7 | | 1000 | 1500 | 60 | 96.0 | 311 | 14.1 | 95.4 |
| 414 | 6.57 | 0.375 | 0.17 | 9160 | 0.11 | 1.6 | 4.8 | 1000 | 1600 | 60 | 96.3 | | | |
| 427 | 6.86 | 0.212 | 0.79 | 11240 | 0.1 | 1.5 | 5.2 | 1000 | 1700 | 30 | 98.2 | | | |
| 447 | 7.14 | 0.209 | | 10520 | 0.05 | 2.3 | 6.5 | 1000 | 1200 | 10 | 99.2 | | | |
| 463 | 6.86 | 0.312 | 0.33 | 9400 | 0.09 | 1.5 | | 1000 | 1300 | 20 | 98.5 | 187 | 6.4 | 96.5 |
| 481 | 6.05 | 0.368 | 0.23 | 11800 | 0 | 2.3 | 14.0 | 1000 | | | | | | |
| 500 | 5.43 | 0.237 | 0.73 | 9080 | 0 | 2.2 | 7.5 | 1000 | | | | | | |

We claim:

1. A fiber membrane comprising:
a hydrophobic polyethersulfone matrix;
a hydrophilic polyvinylpyrrolidone anchored to said matrix;
wherein said fiber membrane is a hollow cylinder comprising an interior skin and a porous exterior support structure, and wherein the thickness of the exterior support is sufficient to permit said hollow cylinder membrane 500 lm²h-1000 lm²h of pure water flux under 20 psig transmembrane pressure; wherein said hollow cylinder membrane has an interior diameter of 0.6 and 1.6 mm, and an exterior diameter between 0.9 and 2.5 nm; a tensile strength of 3 to 5 Mpa, and an elongation character of at least 30%.

2. The hollow fiber membrane of claim 1, wherein said fiber membrane does not include a charged cationic polymer.

3. The hollow fiber membrane of claim 1, wherein said membrane filters turbid water to a level of less than 0.10 NTU and silt density index of less than 3, and wherein the membrane withstands at least 7.0 kg/cm² of burst strength.

* * * * *